(12) United States Patent
Harada et al.

(10) Patent No.: US 7,392,225 B2
(45) Date of Patent: *Jun. 24, 2008

(54) REVOCATION INFORMATION UPDATING METHOD, REVOCATION INFORMATION UPDATING APPARATUS AND STORAGE MEDIUM

(75) Inventors: Shunji Harada, Osaka (JP); Makoto Tatebayashi, Takarazuka (JP); Masayuki Kozuka, Arcadia, CA (US); Teruto Hirota, Moriguchi (JP); Toru Kamibayashi, Chigasaki (JP); Masafumi Tamura, Choufu (JP)

(73) Assignees: Matsushita Electric Industrial Co., Ltd., Osaka (JP); Kabushiki Kaisha Toshiba, Kanagawa (JP)

( * ) Notice: Subject to any disclaimer, the term of this patent is extended or adjusted under 35 U.S.C. 154(b) by 346 days.

This patent is subject to a terminal disclaimer.

(21) Appl. No.: 11/010,771

(22) Filed: Dec. 13, 2004

(65) Prior Publication Data
US 2005/0154880 A1    Jul. 14, 2005

Related U.S. Application Data

(62) Division of application No. 09/436,035, filed on Nov. 8, 1999, now Pat. No. 6,850,914.

(51) Int. Cl.
*G06F 17/60* (2006.01)
(52) U.S. Cl. ........................................ 705/50
(58) Field of Classification Search ................ 705/50
See application file for complete search history.

(56) References Cited

U.S. PATENT DOCUMENTS

| | | | |
|---|---|---|---|
| 4,740,890 A | 4/1988 | William | |
| 5,400,319 A | 3/1995 | Fite et al. | |
| 5,450,366 A * | 9/1995 | Watanabe | 365/230.01 |
| 5,699,431 A | 12/1997 | Van Oorschot et al. | |
| 5,805,551 A | 9/1998 | Oshima et al. | |
| 5,805,699 A | 9/1998 | Akiyama et al. | |
| 5,857,021 A | 1/1999 | Kataoka et al. | 380/4 |
| 5,892,900 A * | 4/1999 | Ginter et al. | 726/26 |

(Continued)

FOREIGN PATENT DOCUMENTS

EP    0930556 A2    7/1999

(Continued)

OTHER PUBLICATIONS

Yamanaka, Kiyoshi et al., "Trends in Digital Copy Protection Technologies", NTT Review, Telecommunications Association, Tokyo, Japan vol. 11, No. 1, Jan. 1999, pp. 108-115.

(Continued)

*Primary Examiner*—Jim Trammell
*Assistant Examiner*—Hai Tran

(57) ABSTRACT

At least one set of revocation information for identifying electronic appliances that should be revoked for content protection and master revocation information for identifying electronic appliances that have special permission to update the revocation information are recorded in advance into a special storage region on a storage medium. When the storage medium is loaded into an electronic appliance indicated by the master revocation information, the revocation information can be updated. However, when the storage medium is loaded into an electronic appliance indicated by the revocation information, the electronic appliance is revoked and so the protection of contents is improved.

6 Claims, 9 Drawing Sheets

U.S. PATENT DOCUMENTS

| | | | |
|---|---|---|---|
| 5,912,849 A * | 6/1999 | Yasu et al. | 365/195 |
| 5,949,877 A * | 9/1999 | Traw et al. | 713/171 |
| 6,052,780 A * | 4/2000 | Glover | 713/193 |
| 6,092,201 A | 7/2000 | Turnbull et al. | |
| 6,128,740 A | 10/2000 | Curry et al. | |
| 6,233,341 B1 | 5/2001 | Riggins | |
| 6,278,836 B1 | 8/2001 | Kawara et al. | |
| 6,324,518 B1 | 11/2001 | Katsurabayashi et al. | 705/14 |
| 6,418,421 B1 | 7/2002 | Hurtado et al. | 705/54 |
| 6,421,779 B1 | 7/2002 | Kuroda et al. | 395/186 |
| 7,137,012 B1 * | 11/2006 | Kamibayashi et al. | 713/193 |
| 2001/0021255 A1 | 9/2001 | Ishibashi | |
| 2001/0021926 A1 | 9/2001 | Schneck et al. | |
| 2002/0035492 A1 | 3/2002 | Nonaka | |

FOREIGN PATENT DOCUMENTS

| | | |
|---|---|---|
| JP | 2000-357126 | 12/2000 |
| JP | 2001-166996 | 6/2001 |

OTHER PUBLICATIONS

Rosen, Michele, "IBM Proposes Foundation for Electronic Commerce," Midrange Systems, vol. 9, No. 8, p. 32, May 24, 1996.

O'Connor, Mary Ann, "New Distribution Option for Electronic Publishers," CD-ROM Professional, vol. 7, No. 2 pp. 134-135, Mar. 1994.

* cited by examiner

REVOCATION INFORMATION UPDATING METHOD, REVOCATION INFORMATION UPDATING APPARATUS AND STORAGE MEDIUM

RELATED APPLICATION

This application is a divisional application of U.S. Ser. No. 09/436,035 filed on Nov. 8, 1999, now U.S. Pat. No. 6,850,914.

BACKGROUND OF THE INVENTION

1. Field of the Invention

The present invention relates to a method for recording digital contents such as digitized documents, audio, images and programs onto a storage medium and for reproducing such contents using a compatible electronic appliance. In particular, the invention relates to a method for updating revocation information that is used to prevent unauthorized electronic appliances from recording and reproducing digital contents.

2. Description of the Related Art

As computer technology has advanced in recent years, great variety of electronic appliances with multimedia functions have been developed. Examples of such are personal computers, set-top boxes, reproduction devices and game consoles. In addition to reproducing image data, audio data and other types of digital contents from recording media, such devices can also download digital contents from networks like the Internet.

Digital contents are generally copyrighted material that has digitally encoded according to a technique such as MPEG 2 (Moving Pictures Experts Group 2) or MP3 (Moving Pictures Experts Group—Audio Layer 3). Such contents can be copied and transmitted on networks with no loss in quality, so that there is a growing need for technologies to stop copyright violations.

Current electronic appliances such as personal computers, set-top boxes, and reproduction devices tend to use "reversible" recording media that are not player-dependent and whose specifications are generally made public. This means that users are free to transfer or copy digital contents onto other media, so that there is no effective way of protecting a digital content recorded on a recording medium.

Memory cards, where a recording medium and a controller are integrated, have recently appeared on the market. Such cards can be provided with a secret region (a "concealed region) that can be accessed by an access control function of the controller according to a special procedure, but otherwise cannot be accessed by users. It is believed that digital contents can be protected by recording important information (such as copy control information and transfer control information) that relates to the way in which digital contents can be used in such a concealed region.

The following describes one conceivable way to protect the copyright of a digital content. Whenever a digital content is transferred between any of the electronic devices mentioned above and a recording medium, both devices first perform mutual authentication whereby each device checks that the other is an authentic device which is equipped with the same copyright (content) protection mechanism (i.e., a predetermined content protection function). When both devices are authentic, they then exchange keys according to a key generation algorithm provided in both devices. Both devices thus obtain an authentication key, and use this key to respectively encrypt and decrypt either a content key (a different key used to encrypt the digital content), or the digital content itself.

The above technique has the following problem. The content protection mechanism (such as the information used for mutual authentication and the program used) has to be set in the electrical appliance before it is shipped from the factory. After purchase, the electrical appliance (or more specifically the programs that run on an electrical appliance) may be subjected to tampering which renders the content protection mechanism inoperative. Such a modified electrical appliance cannot be detected and stopped by mutual authentication alone.

Digital contents could conceivably be afforded better protection by pre-recording revocation information, which enables invalid electrical appliances to be detected, in special region on a recording medium. When the recording medium is loaded into an electrical appliance indicated by the revocation information, the contents on the recording medium could be protected by invalidating the electronic appliance.

However, it would still be necessary to set such revocation information before the recording medium is shipped from the factory. There would still be no way for the recording medium to detect and stop electrical appliances (or programs of such appliances) that have been modified if such modification technique was not known when the recording medium was produced.

SUMMARY OF THE INVENTION

The present invention was conceived in view of the stated problems with the prior art and has an object of providing a revocation information updating method, a revocation information updating apparatus and a storage medium. One or more sets of revocation information, for identifying electronic apparatuses that should be revoked to protect contents, and master revocation information (itself a special kind of revocation information), for identifying electronic appliances that have special permission to update the revocation information, are recorded into a special region on a storage medium. By doing so, the revocation information can be updated whenever the storage medium is loaded into an electronic appliance that is shown by the master revocation information.

A revocation information updating method that achieves the stated object is a revocation information updating method for updating revocation information on a storage medium, the storage medium (1) being capable of recording and playing back a digital content when used by an electronic appliance having at least one of a function for playing back a digital content and a function for recording a digital content and (2) storing, in advance, revocation information that is used to judge which electronic apparatuses should be prevented from using the storage medium to protect digital contents, the revocation information updating method including:

(a) a recording step for recording the following information into a special storage region provided on the storage medium:

master revocation information that is judgeable by special electronic appliances that have special permission to update the revocation information, and at least one set of revocation information for identifying electronic appliances that should be revoked to protect contents;

and for recording the following information into a special storage region provided in each electronic appliance that has special permission to update the revocation information:

first identification information for showing that an appliance has special permission to update the revocation information second identification information for showing that an apparatus is capable of identifying revocation information, out of the sets of revocation information, that is to be updated;

(b) (i) for judging, when a storage medium has been loaded into an electronic appliance that has special permission to update the revocation information, whether to revoke the electronic appliance that has special permission to update the revocation information, based on the first identification information and the master revocation information, (ii) for terminating processing on judging in step (i) that the electronic appliance should be revoked, (iii) for judging, on judging in step (i) that the electronic appliance should not be revoked, whether the electronic appliance should be revoked, based on the second identification information and the updateable revocation information in the sets of revocation information, (iv) for terminating processing on judging in step (iii) that the electronic appliance should be revoked, (v) an updating step for updating, on judging in step (iii) that the electronic appliance should not be revoked, the updateable revocation information with new revocation information.

The stated construction allows the revocation information to be updated whenever the storage medium is loaded into an electronic appliance that has special permission to update the master revocation information. When the storage medium is inserted into an electronic appliance that is indicated by the revocation information, the electronic apparatus will be revoked from using the storage medium, thereby improving the security with which contents are protected.

NUMERICAL REFERENCES

1 . . . Content Distribution System (CDS)
2 . . . Secure Content Server (SCS)
3 . . . EMD I/F Unit
5 . . . PD I/F Unit
6 . . . Media I/F Unit
7 . . . Concealed Region Driver
8 . . . Registry Storage Unit
9 . . . License Storage Unit
10 . . . Music Data Storage Unit
12 . . . PD (Recording/Playback Device)
13 . . . PM (Storage Medium)
14 . . . Revocation Information Reception Unit
15 . . . Revocation Information Storage Unit
112, 122, 132, 162 . . . Open ROM Region
113, 123, 133, 163 . . . Open R/W Region
114, 124, 134, 164 . . . Concealed Region
130 . . . Controller

DESCRIPTION OF THE PREFERRED EMBODIMENT

The following describes an embodiment of the present invention with reference to the attached figures.

Figure 1:
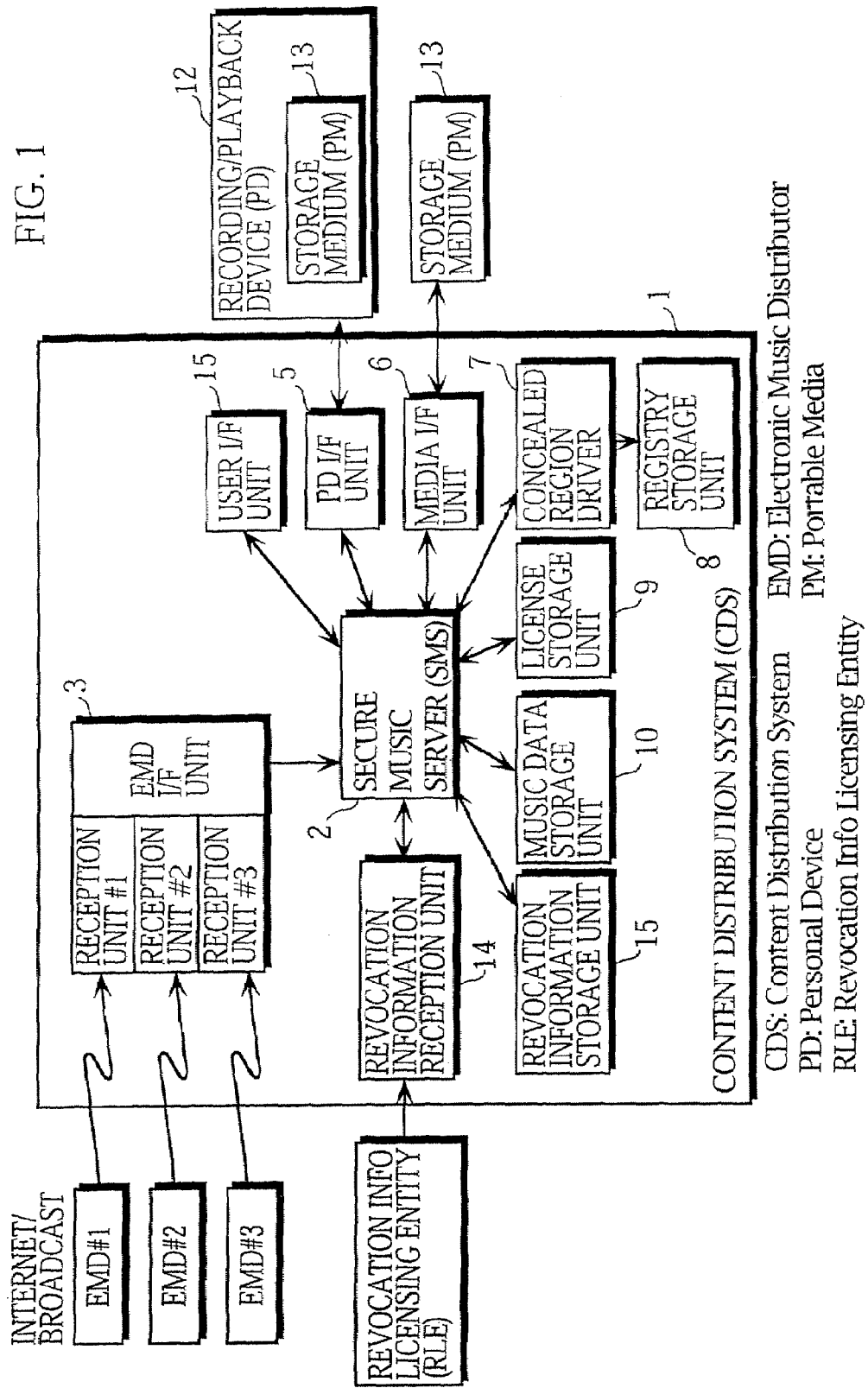
FIG. 1 is a block diagram of a content distribution system (CDS) equipped with a revocation information updating function that is an embodiment of the present invention.

FIG. 1 shows an example construction for a content distribution system (hereafter, "CDS") 1 that has a revocation information updating function. In the present example, the contents to be protected are digitized music, although this is not a limitation for the present invention, which can also be used to protect other data such as movies or game software.

In FIG. 1, each EMD (Electronic Music Distributor) represents a music distribution server or a music broadcaster.

The CDS 1 is provided, for example, as a special terminal (such as a kiosk terminal) in a record store or elsewhere. The CDS 1 has the following functions.

(1) A Content Recording (Purchase) Function

This function records a content specified by the user onto a recording medium (hereafter "portable media", "storage device", "records device" or simply "PM") 13 loaded into the CDS 1. This equates to when the user purchases the content.

(2) A Revocation Information Updating Function

This function directly relates to the present invention and records and updates the revocation information of an electronic appliance onto a PM 13 loaded into the CDS 1.

The following describes the construction of the CDS 1 with regard to the functions (1) and (2) given above.

(1) Content Recording (Purchase) Function

The method used by the CDS 1 to protect contents assumes that whenever a content is recorded onto a PM 13, the content is encrypted and decrypted using an identification number (media ID) of the PM 13.

The CDS 1 includes a different reception unit (here reception units #1-#3) for each EMD (here, EMD #1-#3), and receives either encrypted contents (in this example, digitized music) or license information (conditions of use, a decryption key for encrypted contents, etc.) from an EMD via the corresponding reception unit. The encrypted contents sent by the EMDs can be produced using different cryptosystems and different audio data compression techniques. The reception units #1-#3 may have playback and billing functions. Users may use such billing functions to purchase their desired contents.

The CDS 1 also has a secure music server (hereafter, secure music server or "SMS") 2. This SMS 2 receives, via an EMD I/F (interface) unit 3, an encrypted content that has been purchased by a user. Such encrypted contents (here, digitized music that has been encrypted and compressed according to techniques utilized by the EMD) are decrypted as necessary by the EMD I/F unit 3 and are subjected to audio compression and/or re-encryption by the CDS 1. On receiving an encrypted content, the SMS 2 stores the content in the music data storage unit 10 and stores the key (the encrypted content decrypting key) for decrypting the encrypted content into the license storage unit 9. This SMS 2 may also have a playback function for allowing users to hear the digitized music on sale before buying, in which case the music handled by the SMS 2 will be reproduced by the CDS 1.

The SMS 2 also has a function for outputting encrypted contents that are stored in the digitized music storage unit via a corresponding I/F unit 6 to a PM 13, such as a memory card, that is loaded into the media I/F unit 6. This PM 13 is used by a specialized playback/recording apparatus (such as a semiconductor memory reader) shown in FIG. 2. This apparatus is hereafter referred to as a portable device (PD) 12 and is capable of decrypting and playing back the encrypted contents (digitized music) recorded on the PM 13. While the SMS 2 records contents onto the PM 13 via the media I/F unit 6, this can alternatively be performed via the PD 12.

Figure 8:
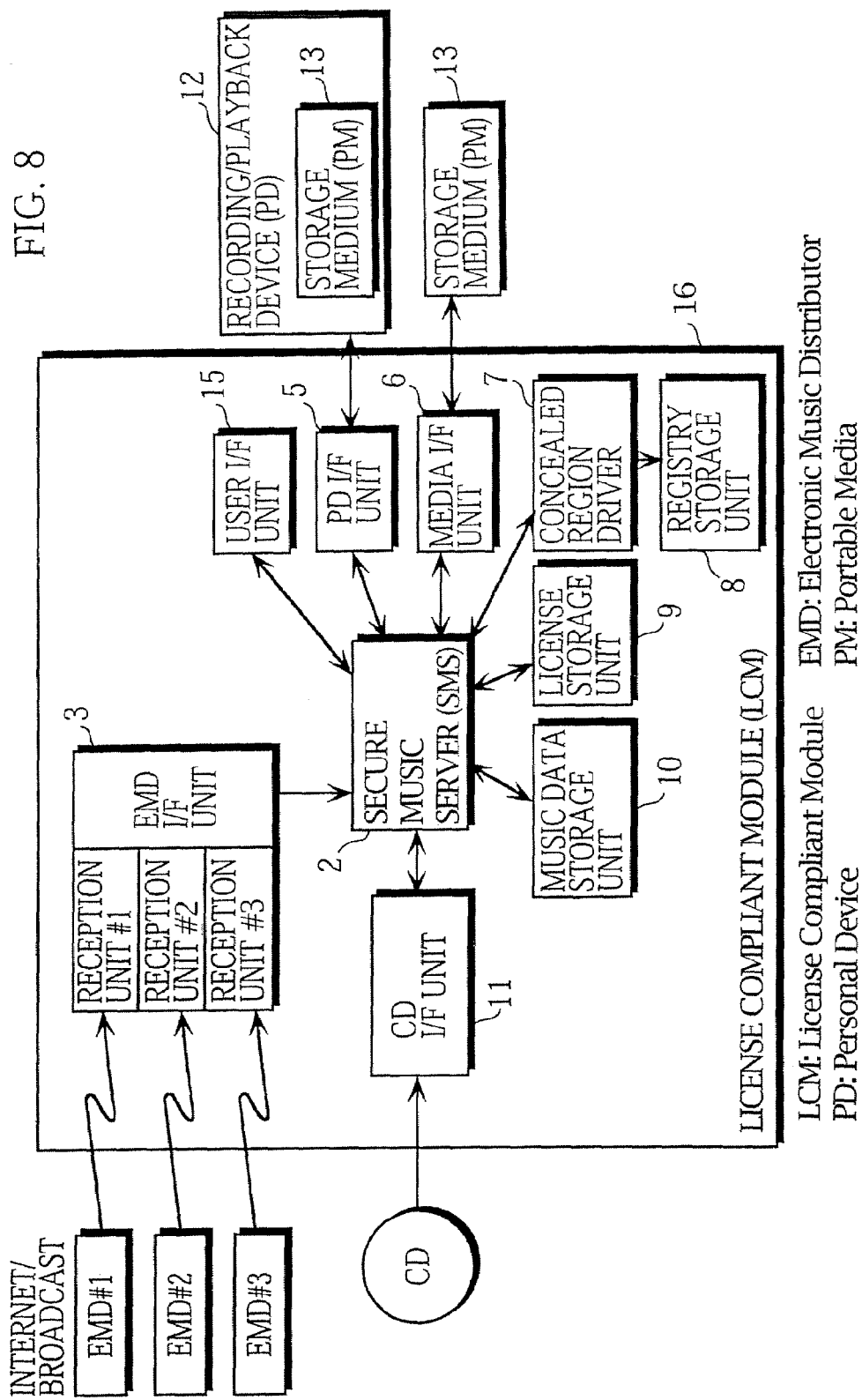
FIG. 8 is a block diagram shown in the LCM 16.

The PM 13 may also be set into the license compliant module (LCM) 16 shown in FIG. 8 so that the encrypted contents (digitized music) recorded on the PM 13 can be decrypted and played back on the LCM 16 or the encrypted contents (digitized music) can be transferred onto the LCM 16 where they are managed thereafter. This LCM 16 can be realized, for instance, by a personal computer. As shown in FIG. 8, this LCM 16 has fundamentally the same structure as the CDS 1, except that the LCM 16 does not have the function for updating the revocation information. This means that the LCM 16 is capable of receiving encrypted contents from an EMD, of managing such contents, of recording such encrypted contents onto a PM 13, and of receiving digitized music from a PM 13 and managing the digitized music thereafter. Since the construction of the LCM 16 has no direct bearing on the present invention, it will not be described.

(2) Revocation Information Updating Function

The revocation information is used to determine whether an electronic appliance (such as the PD or the LCM) should be prohibited from using the PM 13 to protect the contents recorded on the PM 13. Here, "using" the PM 13 can mean the recording of a content onto the PM 13, and the reading or playback of a content from the PM 13. This revocation information is registered on the PM 13 before the PM 13 is shipped from the factory.

The revocation information updating function replaces the revocation information registered on a PM 13 before shipping with new revocation information as necessary via an electrical appliance (in this example, the CDS 1) granted special permission. One example of when the revocation information needs to be updated is when appliances that need to be revoked have been newly discovered.

The CDS 1 has a revocation information receiving unit 14 for receiving new revocation information from a revocation information licensing entity (hereafter RLE). The new revocation information sent from the RLE to the CDS 1 is assumed to be encrypted using an encryption key distributed beforehand to the RLE and the CDS 1 to prevent unauthorized tampering to the new revocation information on the transfer path between the RLE and the CDS 1. The SMS 2 receives, via the revocation information reception unit 14, the encrypted new revocation information that has been issued by the RLE, decrypts the new revocation information, and stores the decrypted new revocation information into the revocation information storage unit 15.

The SMS 2 has a function for outputting the new revocation information stored in the revocation information storage unit 15 via the media I/F unit 6 whenever a PM 13 such as a memory card has been loaded. The recording of new revocation information on the PM 13 from the SMS 2 is performed directly via the media I/F unit 6, though it may alternatively be performed via the PD 12.

The following is a simplified explanation of the different types of revocation information. Note that the recording media (here, PM 13) is not limited to the storage of digitized music, and may alternatively be used for recording an application system, like a so-called "electronic book". When the PM 13 records an electronic book, revocation information is issued for each application system so that electronic appliances can be revoked separately for each of the application systems and so that only electronic appliances with special permission for a given application system can be allowed to update the revocation information corresponding to that application system. In the present example, the CDS 1 is permitted to update only the revocation information for electronic appliances (e.g., PD, LCM) that handle digitized music. By doing so, even if a user tampers with the revocation information updating function of the CDS 1, this will not affect other application systems as the user will still be prevented from updating the revocation information of other application systems. It is also possible to revoke an electronic appliance, such as the CDS 1, that has the special permission to update the revocation information using special revocation information (hereafter called "master revocation information") that is registered on a PM 13. This master revocation information can then be used to revoke a CDS 1 whose revocation information updating function has been tampered with.

Note that in the present embodiment, the master revocation information is not assumed to be updated using the updating method of the present invention. The master revocation information is instead updated by issuing a recording medium on which the new master revocation information is recorded and by using this medium to replace an old recording medium on which the old master revocation information was recorded.

Figure 3:
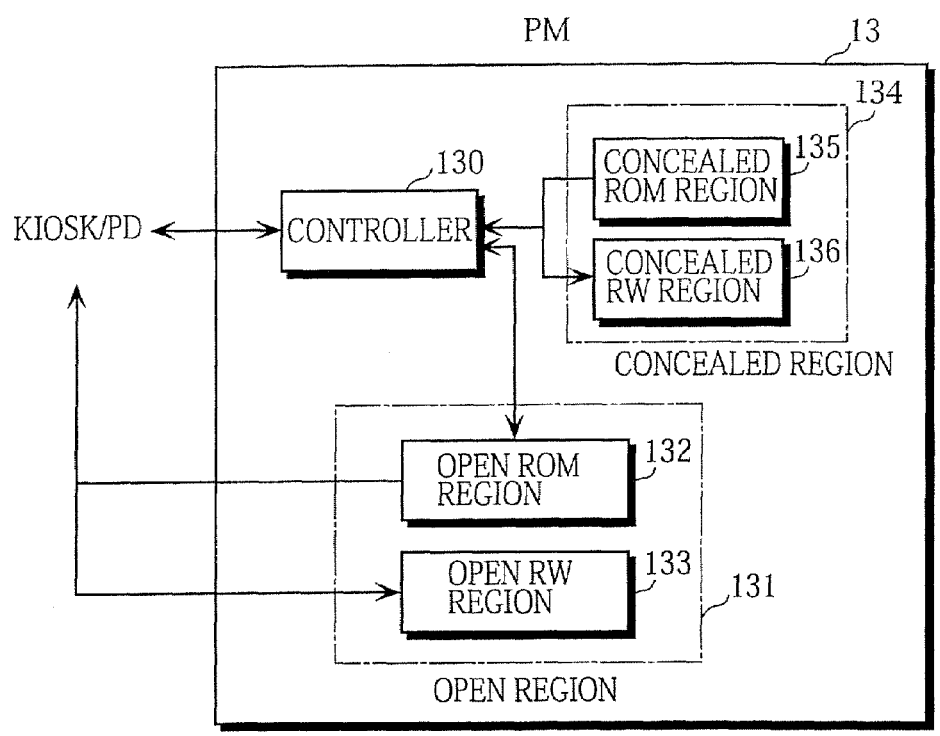
FIG. 3 is a block diagram showing the construction of the PM (recording medium) 13.

As shown in FIG. 3, the PM 13 includes a controller 130 and a recording medium part that is made up of an open region 131 and a concealed region 134. The concealed region 134 is a storage region that can only be accessed via the controller 130 using a secret procedure, and is used to store information that is required when decrypting a content. The concealed region 134 is made up of a concealed ROM region 135 in which a secret constant (such as the unique master media key KM-M that is described later) is stored and a secret rewritable (RW) region 136 that stores secret variables (such as a license decrypting key supplied by the licenser, a content decrypting key that has been encrypted, and a unique media key KM-1). This content decrypting key that has been encrypted (hereafter called the "encrypted content key") is produced by encrypting the content key Kc used for decrypting the content C using the unique media key KM-1 that is unique to the PM 13.

The unique master media key KM-M and the unique media key KM-1 need to be set at different values for each PM 13, with it being possible to use different kinds of identification information for each PM 13, such as a serial number or a product number (the product number of each PM 13 or the production lot number). However, the KM-M and KM-1 may instead be produced from unique identification information of the PM 13 and the license decryption key. As examples, the concealed ROM region 135 can be provided in ROM (i.e., read only non-volatile memory), while the concealed RW region 136 can be provided in a flash memory (i.e., a rewritable non-volatile memory).

The open region 131 is separate from the concealed region and can be accessed by conventional procedures. This open region 131 is composed of a read-only open region 132 (hereafter called the "open ROM region") and a rewritable open region 133 (hereafter called the "open RW region"). Here, it is assumed that the open ROM region 132 also includes a region (hereafter called the "open ROM-W region") that can be only be rewritten according to a secret procedure.

The open ROM region can be provided in a ROM while the open RW region and the open ROM-W region can be provided in a flash memory. The open ROM region, the open ROM-W region and the open RW region may be respectively provided on the same ROM as the concealed ROM region and the same flash memory as the concealed RW region.

The master revocation information is registered in advance in the open ROM region 132 before the PM 13 is shipped from the factory. One or more sets of revocation information are also registered in advance in the open ROM region 132 before shipping. Such sets of revocation information can be replaced (updated) by executing the revocation information updating function of the CDS 1, which results in new revocation information being written into the open ROM-W region via the controller 130 of the PM 13 according to a secret procedure. Note that one or more sets of revocation information that do not need to be updated according to the method of the present invention may also be registered in advance in the open ROM region 132.

In the present embodiment, the master revocation information and the one or more sets of revocation information are lists of identification information (device IDs) of electronic appliances that should be revoked. As a result, the following explanation will refer to each set of revocation information as a "revocation list RL". The master revocation information will be referred to as "RL-M", and each set of revocation information as "RL-1", "RL-2" etc., where the revocation list RL-1 is used to revoke electronic appliances (such as a PD or an LCM) that record or play back digitized music.

Contents that have been encrypted (hereafter simply "encrypted contents") are stored as required in the open RW region 133. These contents have been encrypted using the content key Kc.

Figure 4B:
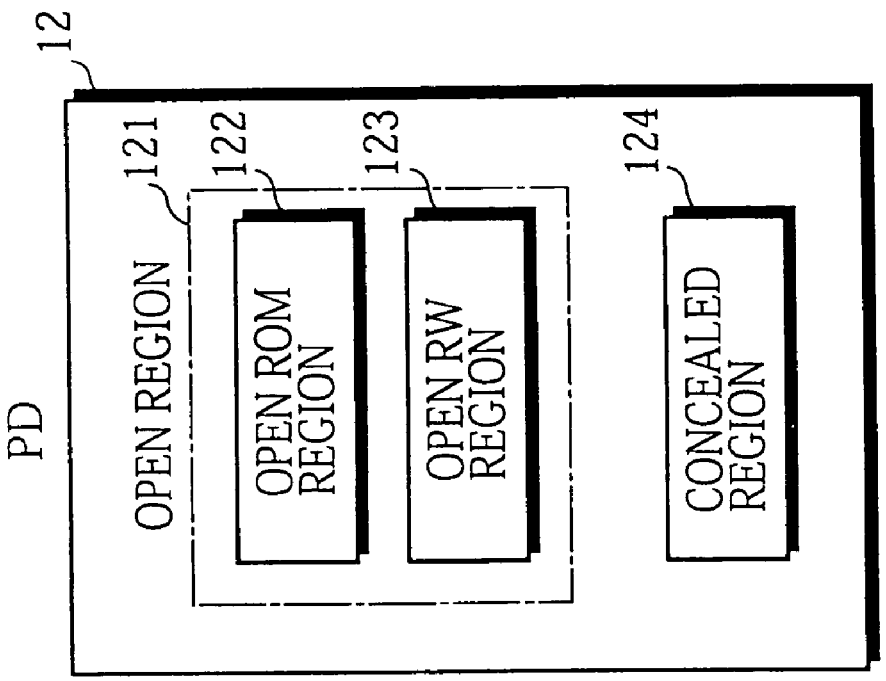
FIGS. 4A and 4B show examples of how the storage regions of the CDS 1 and the PD 12 may be composed.
Figure 4A:
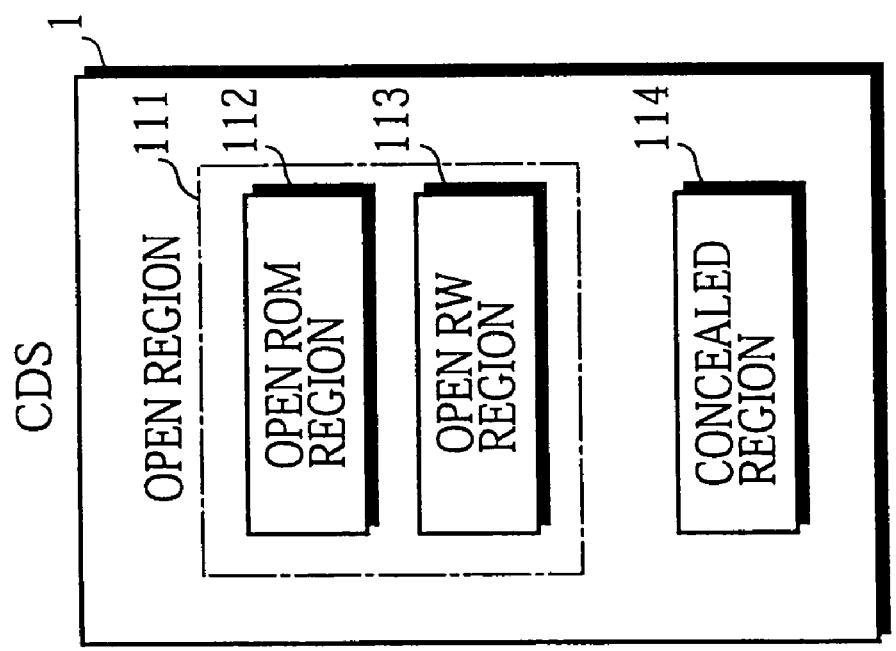
Figure 9:
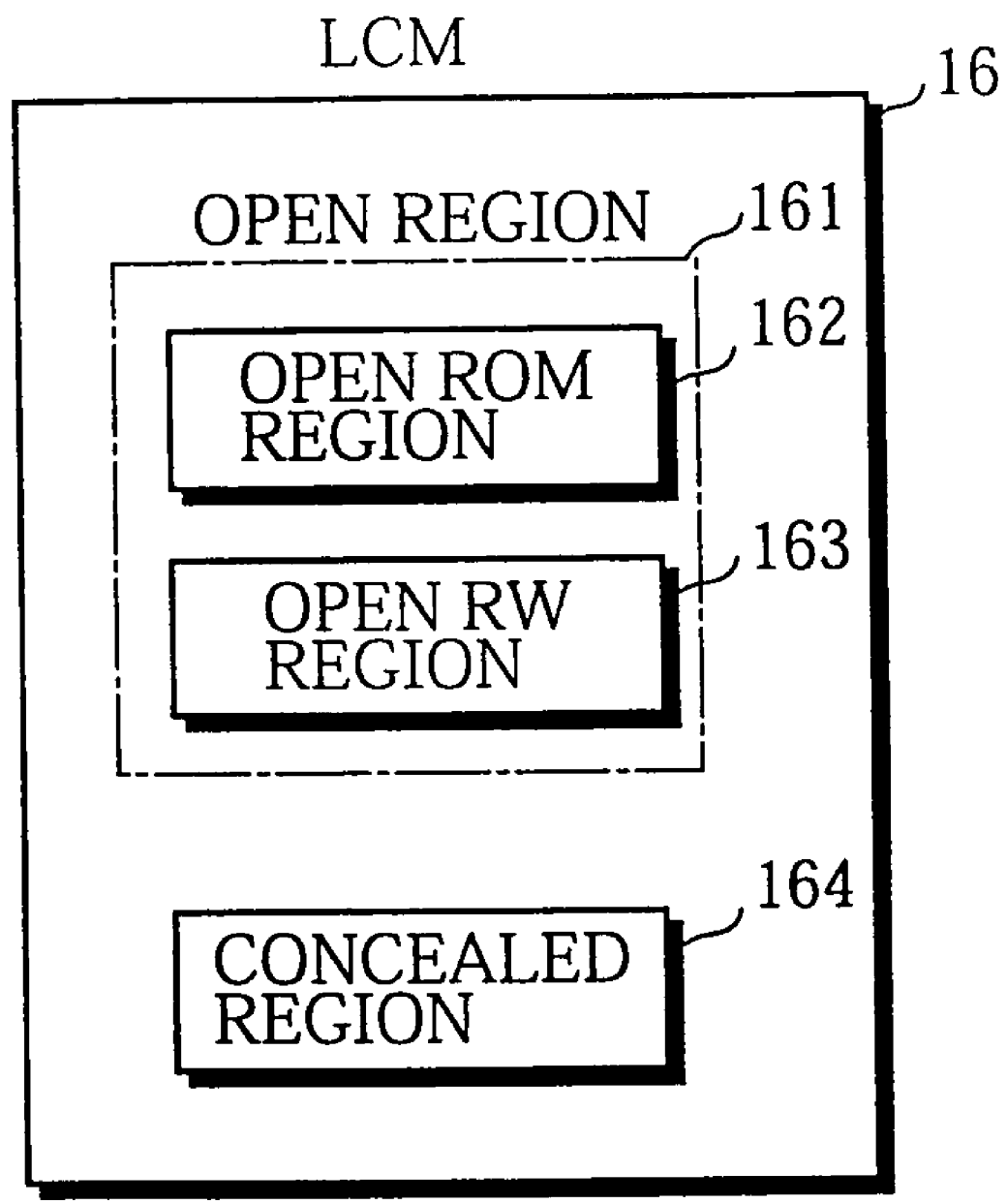
FIG. 9 shows an example of how the storage regions of the LCM 16 may be composed.

The CDS1, the PD 12, and the LCM 16 have the same storage regions as the PM 13 (see FIGS. 4 and 9).

The CDS 1 has an open region 111, which is made up of the open ROM region 112 and the open RW region 113, and a concealed region 114 that can only be accessed according to a secret procedure. The music data storage unit 10 shown in FIG. 1 is provided in the open RW region 113. The open ROM region 112 includes an open ROM-W region (not illustrated) in which the revocation information storage unit 15 shown in FIG. 1 is provided. Here, the SMS 2 shown in FIG. 1 decrypts the encrypted new revocation information that is received from the RLE and stores the decrypted new revocation information into this open ROM-W region using a secret procedure.

The identification information (device ID) ID_CDS is stored in advance in the concealed region 114. A content key Kc for each content is also stored as necessary in the concealed region 114. The concealed region 114 also provides the registry storage unit 8 shown in FIG. 1. All of the music contents that are stored in the music data storage unit 10 (in the open RW region 113) and are managed by the SMS 2 have a content ID (TID) and other such identification information as their attributes. This attribute information is called the "registry" and is stored in the registry storage unit 8 (provided in the concealed region 114). The CDS 1 has a concealed region driver 7 that performs a special secret procedure to enable the SMS 2 to access the registry storage unit 8 in the concealed region 114 and then read data from the registry storage unit 8. Note that the registry has no direct bearing on the present invention, and so its use will not be described in detail.

The PD 12 includes an open region 121, made up of the open ROM region 122 and the open RW region 123, and a concealed region 124 that can only be accessed by a secret procedure. The identification information ID_PD of the PD 12 is permanently registered in the concealed region 124. A content key Kc for each content is also stored in the concealed region 124.

Figure 2:
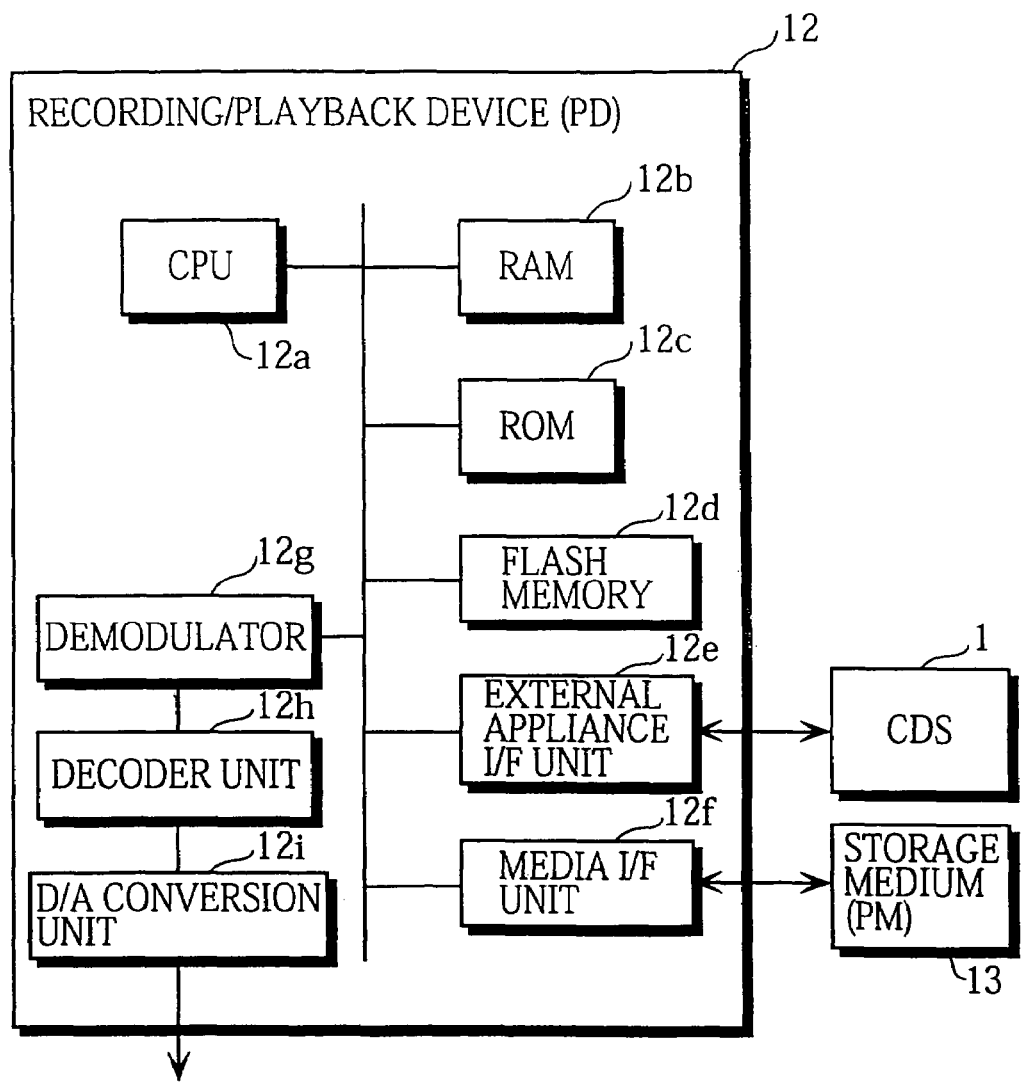
FIG. 2 is a block diagram showing the construction of the PD (recording/playback device) 12[1]

FIG. 2 shows an example construction of the PD 12. The PM 13 is used having been loaded into the media I/F unit 12f of the PD 12. When the CDS 1 reads or writes data via the PD 12, the PD I/F unit 5 provided in the CDS 1 accesses the concealed region 134 (see FIG. 3) via the external appliance I/F unit 12e and the media I/F unit 12f of the PD 12. The media I/F unit 12f has a concealed region access unit (not illustrated) for accessing the concealed region 134 of the PM 13. The open RW region 123 of the PD 12 and the concealed region 124 (see FIG. 4) are provided, for example, in the flash memory 12d. In addition, the open ROM region 122 (see FIG. 4) is provided in the ROM 12c. A program that enables mutual authentication to be performed with the PM 13 is written in this ROM 12c. This program is executed in the PD 12 according to the control of the CPU 12a and so has the PD 12 perform mutual authentication with the PM 13.

In the same way, the LCM 16 has an open region 161, which is made up of an open ROM region 162 and an open RW region 163, and a concealed region 164 that can only be accessed according to a secret procedure. Identification information ID_LCM of the LCM 16 is permanently registered in advance in the concealed region 164, as are content keys Kc for each of the contents.

FIG. 8 shows an example construction of the LCM 16. The PM 13 is used having been loaded into the media I/F unit 6 of the LCM 16. When the LCM 16 reads or writes data on the PM 13, the media I/F unit 16d provided in the LCM 16 accesses the concealed region 134 (see FIG. 3). The media I/F unit 6 has a concealed region access unit (not illustrated) for accessing the concealed region 134 of the PM 13. The open RW region 163 and the concealed region 164 (see FIG. 9) of the LCM 16 are provided, for example, in a flash memory (not illustrated). In addition, the open ROM region 162 (see FIG. 9) is provided in a ROM (not illustrated). A program that enables mutual authentication to be performed with the PM 13 is written in this ROM. This program is executed in the LCM 16 according to the control of a CPU (not illustrated) and so has the LCM 16 perform mutual authentication with the PM 13.

Figure 5:
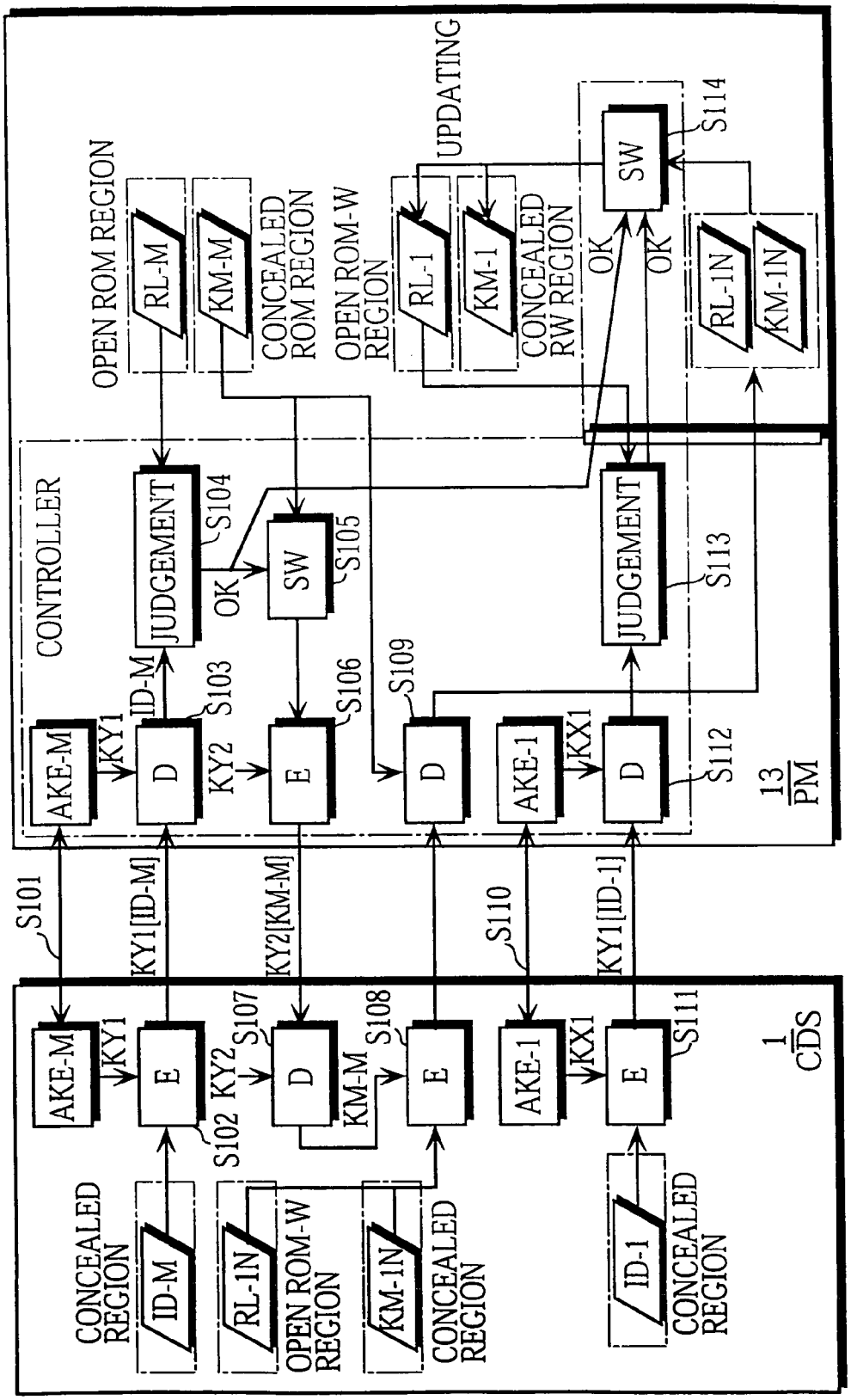
FIG. 5 shows the operation procedure used when recording a content from the CDS 1 onto the PM 13.
Figure 6:
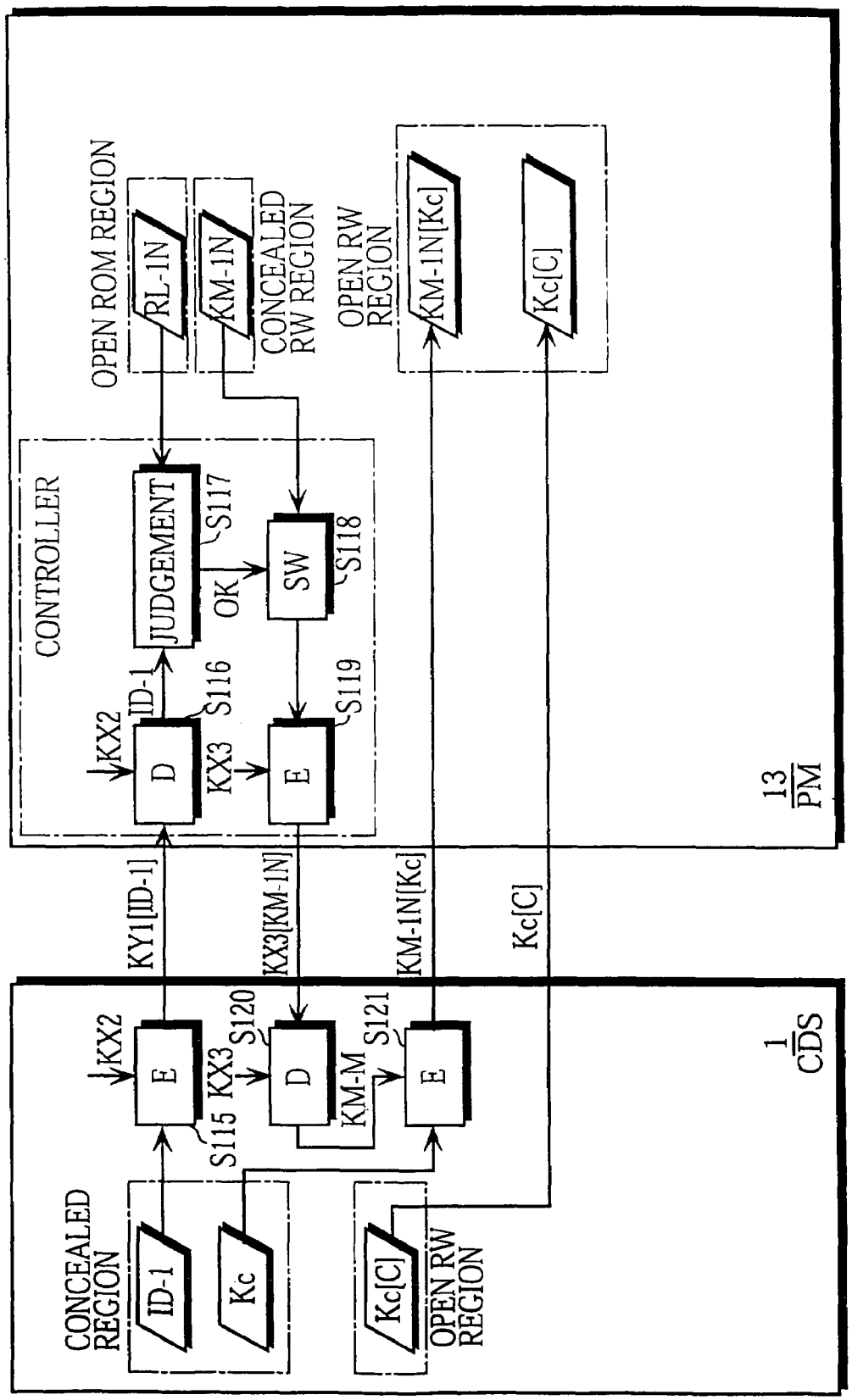
FIG. 6 shows the operation procedure used when recording a content from the CDS 1 onto the PM 13.

The following describes the operation of the present embodiment when the user inserts a PM 13 into the CDS 1 and selects an operation whereby a music content distributed by an EMD is recorded onto the PM 13, while at the same time the revocation information issuing function (RLE) is invoked and new revocation information that is already stored in the CDS 1 is recorded onto the PM 13 together with the music content. This description refers to the flowcharts shown in FIGS. 5 and 6.

The user indication to buy the music content can be made, for example, via the user I/F unit 15 of the CDS 1, and when a PM 13 is loaded into the media I/F unit 6, the media I/F unit 6 of the CDS 1 can perform mutual authentication (also known as Authentication and Key Exchange-Master (AKE-M)) with the controller 130 of the PM 13 (Step S101). This AKE-M procedure is performed by the CDS 1 and the PM 13 as follows.

First, the CDS 1 authenticates the PM 13. A special CDS 1 that is allowed to update the revocation information is provided with an authentication key k1-M, as is the PM 13 (while not illustrated, these keys are stored in the concealed ROM region). The CDS 1 generates a random number R1 and sends it to the PM 13. On receiving the random number R1 generated by the CDS 1, the PM 13 encrypts the random number R1 using the authentication key k1-M and sends the resulting encrypted random number R1 (k1-M[R1]) to the CDS 1. The CDS 1 uses the authentication key k1-M to decrypt this k1-M [R1] and, if the result is equal to the random number R1, judges that the PM 13 is a proper device.

After this, the PM 13 performs the same process for the CDS 1 to complete the mutual authentication. To do so, both the CDS 1 and the PM 13 have an authentication key k2-M, with the CDS 1 encrypting the random number R2 received from the PM 13 using this authentication key k2-M and the PM 13 decrypting this, before confirming that the result is equal to the random number R2.

In the present example, the authentication keys k1-M and k2-M are only supplied to a special electronic appliance (here, the CDS 1) that is allowed to update the revocation information, so that ordinary electronic appliances (such as the LCM 16) can be prevented from executing the authentication process AKE-M.

When the CDS 1 and the PM 13 have found each other to be proper devices in the above mutual authentication AKE-M of step S101, the media I/F unit 6 of the CDS 1 and the controller 130 of the PM 13 perform key exchange to share the same session key (KY1). As one example, this session key KY1 can be a value found by taking an exclusive logical OR for the random numbers R1 and R2 generated during the mutual authentication and then inputting the result into a secret key generation algorithm provided in advance in both the CDS 1 and the PM 13. In this way, the session key KY1 is a time-variant key whose value changes every session.

The media I/F unit 6 of the CDS 1 reads the master identification information ID-M for the CDS 1 that is concealed (stored) within the concealed region 114, encrypts this information ID-M using the session key KY-1 and sends the resulting encrypted ID-M (=KY1[ID-M]) to the PM 13 (step S102). The controller 130 of the PM 13 decrypts this KY1[ID-M] received from the CDS 1 using the session key (KY1) that it received during the preceding key exchange and so obtains the ID-M (step S103).

Next, the controller 130 of the PM 13 uses the master identification information ID-M of the CDS 1 that it has decrypted to refer to the master revocation list RL-M in the open ROM region 132. The controller 130 judges whether the CDS 1 should be prohibited from using the PM 13 by checking whether identification information that matches the ID-M is present in the master revocation list RL-M, (step S104).

If identification information that matches the ID-M is present in the master revocation list RL-M, the controller 130 invalidates (revokes) use of the PM 13 by the CDS 1 and terminates its processing at this juncture.

On the other hand, if identification information that matches the ID-M is not present in the master revocation list RL-M, the controller 130 judges that the CDS 1 is allowed to use the PM 13 (i.e., to update the revocation information), and so reads and outputs the unique master media key KM-M that is stored in a secret fashion in the concealed ROM region 135 (step S105). The controller 130 then performs key exchange with the media I/F unit 6 of the CDS 1 to share the same session key KY-2, before encrypting the read unique master media key KM-M using this session key KY-2 and sending the resulting encrypted KM-M (=KY2[KM-M]) to the CDS 1 (step S106).

This session key KY2 can be found, for example, as the result given when the session key KY1 described earlier is inputted into a secret key generation algorithm provided in advance in the CDS 1 and the PM 13.

The media I/F unit 6 of the CDS 1 decrypts the KY2[KM-M] received from the PM 13 using the session key KY2 obtained during the preceding key exchange and so obtains the unique master media key KM-M (step S107).

Next, the media I/F unit 6 of the CDS 1 encrypts the new revocation information stored in the open ROM-W region and the new unique media key KM-1N generated by the media I/F unit 6 using the unique master media key KM-M and sends the resulting encrypted KM-M[RL-M] and KM-M[KM-1N] to the PM 13 (step S108).

The unique media key KM-1N referred to here can be given, for example, as the output value produced when the session key KY2 described earlier is inputted into a key generation algorithm that is secretly stored in the CDS 1. The controller 130 of the PM 13 decrypts the KM-M[RL-M] and the KM-M[KM-1N] received from the CDS 1 using the KM-M stored in the concealed ROM region 135 and so obtains RL-M and KM-1N (step S109).

Next, the media I/F unit 6 of the CDS 1 and the controller 130 of the PM 13 perform a similar mutual. authentication (AKE-1) to the mutual authentication (AKE-M) described above (step S110).

When doing so, the CDS 1 first authenticates the PM 13. To do so, both the CDS 1 and the PM 13 store the same authentication key k1-1 (which, while not illustrated, is stored in the respective concealed ROM regions). The CDS 1 generates the random number R3 and sends it to the PM 13. On receiving this random number R3, the PM 13 encrypts it using the authentication key k1-1 and sends the resulting encrypted random number (k1-1[R3]) to the CDS 1. The CDS 1 uses the authentication key k1-1 to decrypt the k1-1[R3], checks whether the decryption result is equal to the random number R3 it generated earlier, and if so, judges that the PM 13 is a proper device.

After this, the PM 13 performs the same process for the CDS 1 to complete the mutual authentication. To do so, both the CDS 1 and the PM 13 have an authentication key k2-1, with the CDS 1 encrypting a random number R4 received from the PM 13 using this authentication key k2-1 and the PM 13 decrypting this, before confirming that the result is equal to the random number R4. These authentication keys k1-1 and k2-1 are only provided to electronic appliances (in this example, PD 12 and LCM 16) that are allowed to use music contents, and so can prevent electronic appliances that correspond to other application systems from performing the authentication process AKE-1.

When the CDS 1 and the PM 13 have found each other to be proper devices in the above mutual authentication AKE-1 of step S110, the media I/F unit 6 of the CDS 1 and the controller 130 of the PM 13 perform key exchange to share the same session key (KX1). As one example, this session key KX1 can be a value found by taking an exclusive logical OR for the random numbers R3 and R4 generated during the mutual authentication and then inputting the result into a secret key generation algorithm provided in advance in both the CDS 1 and the PM 13. In this way, the session key KX1 is a time-variant key whose value changes every time.

The media I/F unit 6 of the CDS 1 reads the identification information ID-1 for the CDS 1 that is concealed (stored) within the concealed region 114, encrypts this information ID-1 using the session key KX-1 and sends the resulting encrypted ID-1 (=KX1[ID-1]) to the PM 13 (step S111). The controller 130 of the PM 13 decrypts this KX1[ID-1] received from the CDS 1 using the session key (KX1) that it received during the preceding key exchange and so obtains the ID-1 (step S112).

Next, the controller 130 of the PM 13 uses the identification information ID-1 of the CDS 1 that it has decrypted to refer to the revocation list RL-1 in the open ROM 132. The controller 130 judges whether the CDS 1 should be prohibited from using the PM 13 by checking whether identification information that matches the ID-1 is resent in the revocation list RL-1 (step S113).

If identification information that matches the ID-1 is present in the revocation list RL-1, the controller 130 invalidates (revokes) use of the PM 13 by the CDS 1 and terminates its processing at this juncture.

On the other hand, if identification information that matches the ID-1 is not present in the revocation list RL-1, the controller 130 judges that the CDS 1 is allowed to use the PM 13 (i.e., to record a content), and so updates RL-1 and KM-1 using the new revocation information RL-1N and the new unique media key KM-1N received in step S109 (step S114).

The media I/F unit 6 of the CDS 1 then performs key exchange with the controller 130 of the PM 13 to share the same session key KX2, before reading the identification information ID-1 from the concealed region 114 of the CDS 1, encrypting it using the session key KX2, and sending this encrypted ID-1 (=KX2[ID-1]) to the PM 13 (step S115). As one example, this session key KX2 can be a value found as the output given when the session key KX1 is inputted into a secret key generation algorithm provided in advance in both the CDS 1 and the PM 13.

The controller 130 of the PM 13 decrypts the KX-2[ID-1] received from the CDS 1 using the session key (KX2) obtained in the preceding key exchange, and so obtains ID-1 (step S116).

Next, the controller 130 of the PM 13 uses the decrypted identification information of the CDS 1 to refer to the new revocation list RL-1N in the open ROM region, and judges whether to prevent the CDS 1 from using the PM 13 according to whether identification information that matches ID-1 is present in the revocation list RL-1N (step S117).

If identification information that matches ID-M is present in the revocation list RL-1N, the controller 130 judges that the present CDS 1 should be prevented from using the PM 13 (i.e., "revoked") and so terminates its processing at this juncture.

On the other hand, if identification information that matches the ID-1 is not present in the master revocation list RL-1N, the controller 130 judges that the CDS 1 is allowed to use the PM 13 (i.e., to record a content), and so reads and outputs the unique media key KM-1N that is stored in a secret fashion in the concealed ROM region 135 (step S118). The controller 130 then performs key exchange with the media I/F unit 6 of the CDS 1 to share the same session key KX3, before encrypting the read unique media key KM-1N using this session key KX3 and sending the resulting encrypted KM-1N (=KX3[KM-1N]) to the CDS 1 (step S119). As one example, this session key KX3 can be a value found as the output given when the session key KX2 is inputted into a secret key generation algorithm provided in advance in both the CDS 1 and the PM 13.

The media I/F unit 6 of the CDS 1 decrypts the KX3[KM-1N] received from the PM 13 using the session key KX3 obtained during the preceding key exchange, and so obtains the unique media key KM-1N (step S120).

The media I/F unit 6 of the CDS 1 next uses the unique media key KM-1N to encrypt the content key Kc that is stored in a secret fashion in the concealed region 114, and sends the resulting encrypted KM-1N[Kc] to the concealed RW region of the PM 13 (step S121).

The media I/F unit 6 of the CDS 1 sends the encrypted content Kc[C] stored in the open RW region 113 to the open RW region of the PM 13 (step S122).

In this way, the method of the present embodiment allows the CDS 1 to receive the encrypted master media key KM-M from a PM 13 only if the CDS is not invalidated (revoked) according to the master revocation list RL-M. The new revocation information RL-1 stored in the open ROM region 114 and the unique media key KM-1N are encrypted using this unique master media key KM-M and are sent to the PM13. As a result, CDS apparatuses that should be invalidated according to the master revocation list RL-M (i.e., electronic appliances that attempt to update the revocation information of the PM 13) will definitely be invalidated (excluded). If a device is invalidated according to the revocation list RL-1, the PM 13 will not update the new revocation information RL-1N or the unique media key KM-1N. In the same way, the encrypted unique media key KM-1N will only be transferred to the CDS 1 from the PM 13 if the CDS 1 is not invalidated according to the new revocation list RL-1N. The content key Kc stored in the concealed region 114 of the CDS 1 is then encrypted using the unique media key KM1-N and sent to the PM 13. In this way, CDS apparatuses that should be invalidated according to the new revocation list RL-1N (i.e., electronic appliances that attempt to use the PM 13) will definitely be invalidated (excluded).

Figure 7:
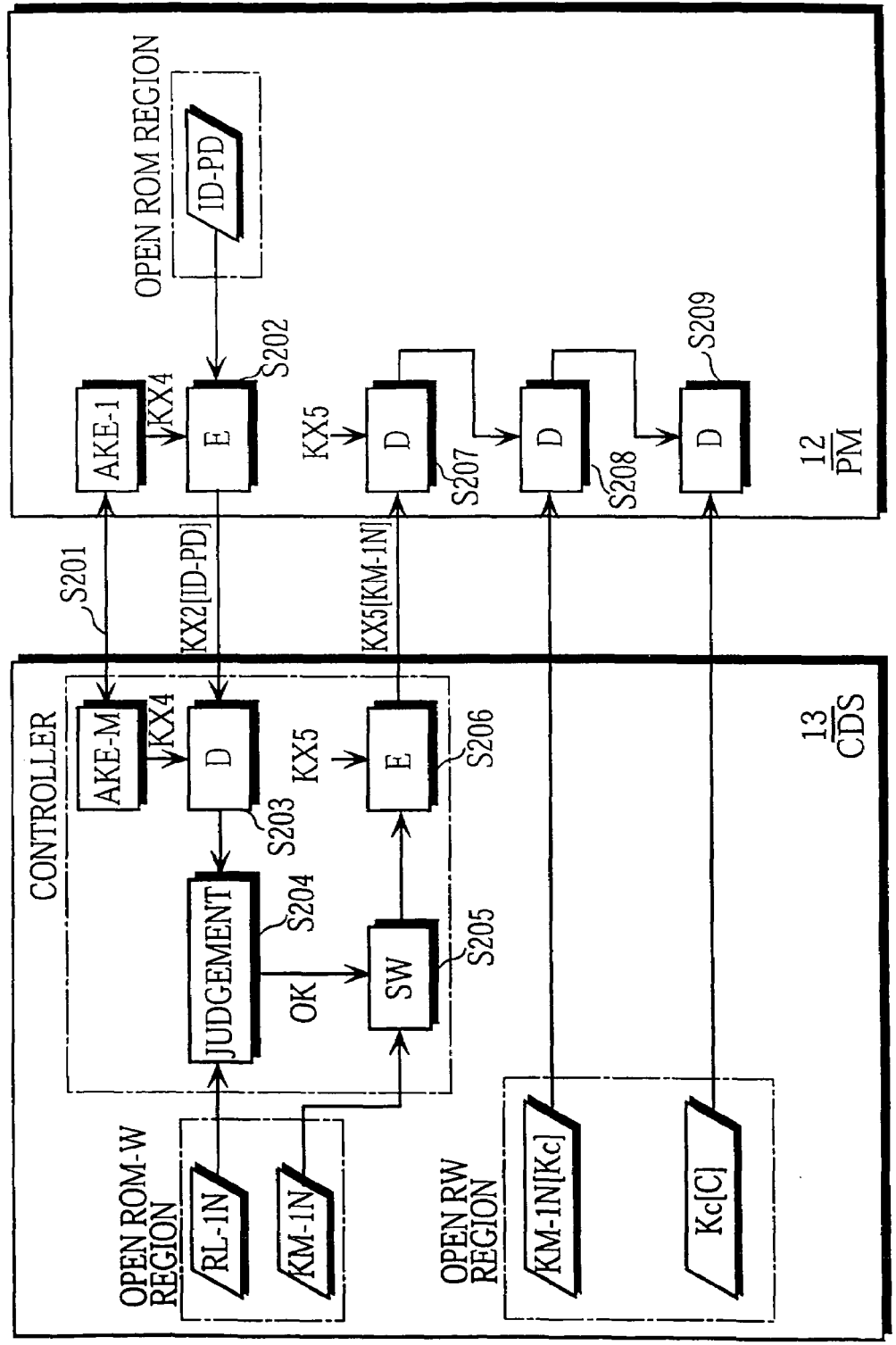
FIG. 7 shows the operation procedure used when the PD 12 or the LCM (license compliant module) 16 decrypts and plays back an encrypted content stored on the PM 13.

The following describes the operation when the PD 12 decrypts and plays back the encrypted content stored in the PM 13, with reference to the flowchart shown in FIG. 7. While this explanation focuses on the case when the content is decrypted and played back by the PD 12, exactly the same procedure is used when contents are decrypted and played back by the LCM 16.

When the user instructs the PD 12 to play back a content from a PM 13 that has been loaded into the media I/F unit 12f of the PD 12, the CPU 12a of the PD 12 and the controller 130 of the PM 13 perform a similar mutual authentication AKE-1 to step S110 (step S201) When the CDS 1 and the PM 13 have found each other to be proper devices in the mutual authentication of step S201, the CPU 12a of the PD 12 and the controller 130 of the PM 13 perform key exchange to share the same session key (KX4).

The CPU 12a of the PD 12 reads the identification information ID-PD of the PD 12 that is concealed within the concealed region 124, and encrypts the identification information ID-PD using the session key KX4. The media I/F unit then sends the encrypted ID-PD (=KX4[ID-PD]) to PM 13 (step S202).

The controller 130 of the PM 13 decrypts the KX4[ID-PD] that it receives from the PD12 using the session key KX4 it received during the preceding key exchange and so obtains the ID-PD (step S203).

The controller 130 of the PM 13 searches for the decrypted identification information ID-PD of the PD 12 in the revocation list RL-1N in the open ROM region and judges whether the PD 12 should be prohibited from using the PM 13 according to whether identification information that matches the ID-PD is present (step S204).

On finding identification information that matches the ID-PD in the revocation list RL-1N, the controller 130 judges that the PD 12 should be invalidated from using the PM 13 (i.e., revoked) and terminates its processing at this juncture.

On the other hand, if identification information that matches the ID-PD is not present in the revocation list RL-1N, the controller 130 judges that the PD 12 is allowed to use the PM 13, and so reads and outputs the unique media key KM-1N that is concealed in the concealed RW region 136 (step S205). The controller 130 then performs key exchange with the CPU 12a of the PD 12 to share (via the media I/F unit 12f of the PD 12) the same session key KX5, before encrypting the read unique media key KM-1N using this session key KX5 and sending the resulting encrypted KM-1N (=KX5 [KM-1N]) to the PD 12 (step S206). This session key KX5 can be found, for example, as the result given when the session key KX4 described earlier is inputted into a secret key generation algorithm provided in advance in the PD 12 and the PM 13.

The CPU 12a of the PD 12 decrypts the KX5[KM-1N] received from the PM 13 using the session key KX5 obtained during the preceding key exchange and so obtains the unique media key KM-1N (step S207).

Next, the CPU 12a of the PD 12 reads the encrypted content key Kc stored in the concealed RW region 136 of the PM 13 and decrypts it using the unique media key KM-1N obtained in step S207 (step S208). Next, the CPU 12a of the PD12 reads the encrypted content C (=Kc[C]) that is stored in the open RW region 133 of the PM 13, decrypts the encrypted content Kc[C] using the content key Kc obtained in step S208, and plays back the content (step S209).

In this way, the method of the present embodiment allows the PD 12 to receive the encrypted unique media key KM-1N from a PM 13 only if the PD 12 is not invalidated (revoked) according to the revocation list RL-1N. The encrypted content key (KM-1N[Kc] concealed in the concealed RW region of the PM 13 is then decrypted using the unique media key KM1-N and is used by the PD 12 to decrypt the encrypted content. In this way, PDs that should be invalidated according to the new revocation list RL-1N (i.e., electronic appliances that attempt to use the PM 13) will definitely be invalidated.

Note that while the present embodiment describes the case where a session key (numbered KYi or KXi) is used to encrypt information that is or should be concealed in a concealed region when transferring the information between the CDS 1 and the PM 13 or between the PD 12 and the PM 13, such encryption is not absolutely necessary. However, encryption using a session key is preferable to increase the security with which contents can be protected.

In the present embodiment, the master revocation list RL-M and the revocation lists RL-1 and RL-1N are described as being registered in the open ROM region 132 or in the open ROM-W region, although such revocation lists may be stored in any region that cannot be altered. As one example, the lists maybe stored in the concealed region 134 which can only be accessed according to a special procedure.

Finally, while the above embodiment describes the case where the encrypted content key (KM-1N[Kc]) is stored in the concealed RW region 136, this key may instead be stored in the open RW region 133.

What is claimed is:

1. A storage device that is capable of recording and playing back a digital content when used by an electronic appliance having at least one of a function for playing back a digital content and a function for recording a digital content, operative with a revocation information updating apparatus, the storage device comprising:

a special storage region in which one or more sets of revocation information for identifying electronic appliances that are invalidated from accessing the storage device and master revocation information for identifying revocation information updating apparatuses that have special permission to update the revocation information are recorded in advance;

a judging means for judging, when the storage device is loaded into the revocation information updating apparatus, whether the revocation information updating apparatus is permitted to update the revocation information present on the storage device, based on the master revocation information;

an updating means for updating the revocation information, depending on the judgment made by the judging means.

2. The storage device of claim 1, wherein each set of revocation information is associated with an application system which is for processing digital contents to be recorded on the storage device, the revocation information updating apparatus is permitted updating of revocation information for at least one application system, and the judging means further bases on the revocation information recorded on the storage device, in judging whether updating is permitted to the revocation information updating apparatus.

3. The storage device of claim 2, wherein the revocation information updating apparatus stores thereon first identification information and second identification information, the first identification information identifying an electronic device which is permitted updating of revocation information, and the second identification information identifying an electronic device which is permitted to use digital contents processed by a certain application system, the judging means a) judges whether the revocation information updating apparatus is permitted to update revocation information, based on the master revocation information and on the first identification information, and b) judges, only when the revocation information updating apparatus is judged to be permitted to update revocation information, whether updating of revocation information for the certain application system is permitted to the revocation information updating apparatus, according to the revocation information for the certain application system, and to the second identification information, and the updating means has the revocation information updating apparatus update the revocation information recorded on the storage device, depending on the judgment made by the judging means.

4. The storage device of claim 1 wherein the special storage region includes (1) revocation information data that identifies a first group of appliances of a plurality of appliances that are not authorized to receive proprietary data, and (2) master revocation data that identifies a second group of appliances of the plurality of appliances that are authorized to change predetermined stored data that enables the second group of appliances to alter a table of appliances constituting the first group of appliances.

5. A storage device storing revocation information data which can be updated by a predetermined revocation information updating apparatus identified in the storage device, the predetermined revocation information updating apparatus being permitted to perform updating, the revocation information also including information on an appliance whose permission for recording digital contents onto the storage device and/or for reproducing digital contents recorded on the storage device has been revoked, the storage device comprising:

a storing means for pre-storing master revocation information data on a special storage region allocated in the storage device, the master revocation information data including information on a revocation information updating apparatus whose permission to update revocation information data has been revoked, the special storage region includes (1) revocation information data that identifies a first group of appliances of a plurality of appliances that are not authorized to receive proprietary data, and (2) master revocation data that identifies a second group of appliances of the plurality of appliances that are authorized to change predetermined stored data that enables the second group of appliances to alter a table of appliances constituting the first group of appliances;

a judging unit for, upon detecting the storage device being inserted to the revocation information updating apparatus, judging whether updating is permitted to the revocation information updating apparatus, based on information data on the revocation information updating apparatus that the revocation information updating apparatus has; and an updating unit for 1) having the inserted revocation information updating apparatus update the revocation information data, when the updating is judged to be permitted, and 2) prohibiting the revocation information updating apparatus from updating the revocation information data, when the updating is not judged to be permitted.

6. The storage device of claim 5, storing thereon revocation information data associated with an application system which is for processing digital contents to be recorded on the recording device, the revocation information updating apparatus is permitted updating of revocation information data for at least one application system, and the judging means further bases on the revocation information data recorded on the storage device, in judging whether updating is permitted to the revocation information updating apparatus.

* * * * *

UNITED STATES PATENT AND TRADEMARK OFFICE
CERTIFICATE OF CORRECTION

PATENT NO. : 7,392,225 B2  Page 1 of 1
APPLICATION NO. : 11/010771
DATED : June 24, 2008
INVENTOR(S) : Harada et al.

It is certified that error appears in the above-identified patent and that said Letters Patent is hereby corrected as shown below:

On the Title Page, Item (56)
In the References Cited:
The following reference should be listed
    5,910,987    A*    6/1999    Ginter et al.

Signed and Sealed this

Twenty-third Day of December, 2008

JON W. DUDAS
*Director of the United States Patent and Trademark Office*